US012480848B2

(12) United States Patent
Wang et al.

(10) Patent No.: US 12,480,848 B2
(45) Date of Patent: Nov. 25, 2025

(54) CRACK SENSOR, PREPARATION METHOD THEREFOR, AND APPLICATION THEREOF IN MICRO-FORCE MEASUREMENT

(71) Applicant: QILU UNIVERSITY OF TECHNOLOGY (SHANDONG ACADEMY OF SCIENCES), Jinan (CN)

(72) Inventors: Li Wang, Jinan (CN); Xingyuan Xu, Jinan (CN); Jun Chen, Jinan (CN); Weiguang Su, Jinan (CN); Anqing Li, Jinan (CN); Zhaoqiang Chen, Jinan (CN); Chonghai Xu, Jinan (CN)

(73) Assignee: QILU UNIVERSITY OF TECHNOLOGY (SHANDONG ACADEMY OF SCIENCES), Jinan (CN)

( * ) Notice: Subject to any disclaimer, the term of this patent is extended or adjusted under 35 U.S.C. 154(b) by 0 days.

(21) Appl. No.: 19/021,368

(22) Filed: Jan. 15, 2025

(65) Prior Publication Data
US 2025/0155341 A1 May 15, 2025

Related U.S. Application Data

(63) Continuation of application No. PCT/CN2022/137584, filed on Dec. 8, 2022.

(30) Foreign Application Priority Data

Jul. 15, 2022 (CN) .......................... 202210833004.2

(51) Int. Cl.
*G01N 3/02* (2006.01)
*G01N 3/08* (2006.01)
(Continued)

(52) U.S. Cl.
CPC .................. *G01N 3/02* (2013.01); *G01N 3/08* (2013.01); *G01N 3/62* (2013.01); *G01N 33/4833* (2013.01);
(Continued)

(58) Field of Classification Search
CPC .. G01N 3/02; G01N 3/08; G01N 3/62; G01N 33/4833; G01N 2203/0005;
(Continued)

(56) References Cited

U.S. PATENT DOCUMENTS 10,591,458 B2 * 3/2020 Parker .................... A61B 5/053
2017/0016875 A1 * 1/2017 Parker ................ G01N 33/4833
(Continued)

FOREIGN PATENT DOCUMENTS

CN 106946221 A 7/2017
CN 107374598 A 11/2017
(Continued)

OTHER PUBLICATIONS

Baetens et al., "Cracking effects in squashable and stretchable thin metal films on PDMS for flexible microsystems and electronics", Sci Rep. Jun. 22, 2018;8(1):9492, <https://pubmed.ncbi.nlm.nih.gov/29934604/> (Year: 2018).*

(Continued)

*Primary Examiner* — Jonathan M Dunlap
(74) *Attorney, Agent, or Firm* — IPRO, PLLC

(57) ABSTRACT

A crack sensor, comprising a flexible film, wherein a first side of the flexible film is provided with a plurality of linear protrusions, and an opposite second side of the flexible film is configured with a linear structure; the linear structure comprises, in order from bottom to top, a silver layer, a chromium layer, and a CNT-PDMS layer, wherein the CNT-PDMS layer is composed of polydimethylsiloxane doped with carbon nanotubes; the silver layer is configured (Continued)

with a crack structure, the crack structure being a crack that changes in response to the deformation of the silver layer. The crack sensor effectively resists crack propagation, significantly improving the stability of the crack sensor while also exhibiting high sensitivity. Further provided is a preparation method for the crack sensor.

9 Claims, 16 Drawing Sheets

(51) Int. Cl.
  *G01N 3/62* (2006.01)
  *G01N 33/483* (2006.01)
(52) U.S. Cl.
  CPC ............. *G01N 2203/0005* (2013.01); *G01N 2203/0019* (2013.01); *G01N 2203/0062* (2013.01); *G01N 2203/0282* (2013.01)
(58) Field of Classification Search
  CPC ... G01N 2203/0019; G01N 2203/0062; G01N 2203/0282
  See application file for complete search history.

(56) References Cited

U.S. PATENT DOCUMENTS

| | | | | |
|---|---|---|---|---|
| 2020/0271445 | A1* | 8/2020 | Zhou | B82Y 30/00 |
| 2021/0047486 | A1* | 2/2021 | Baac | B32B 27/08 |
| 2023/0302489 | A1* | 9/2023 | Ryu | B05D 3/12 |

FOREIGN PATENT DOCUMENTS

| | | | | |
|---|---|---|---|---|
| CN | 108368469 | A | | 8/2018 |
| CN | 111721191 | A * | | 9/2020 |
| CN | 113701926 | A | | 11/2021 |
| CN | 115219079 | A | | 10/2022 |
| WO | WO-2017095097 | A1 * | 6/2017 | ............. A61B 5/00 |
| WO | 2021009490 | A1 | | 1/2021 |

OTHER PUBLICATIONS

Du et al., "Optimized CNT-PDMS Flexible Composite for Attachable Health-Care Device", Sensors 2020, 20, 4523, Aug. 13, 2020, <https://www.mdpi.com/1424-8220/20/16/4523> (Year: 2020).*
Kim et al., "Highly durable crack sensor integrated with silicone rubber cantilever for measuring cardiac contractility", Nat Commun 11, 535, Jan. 27, 2020, <https://www.nature.com/articles/s41467-019-14019-y> (Year: 2020).*
Yang et al., "A Wrinkled Ag/CNTs-PDMS Composite Film for a High-Performance Flexible Sensor and Its Applications in Human-Body Single Monitoring", Nanomaterials 2019, 9(6), 850, Jun. 3, 2019, <https://www.mdpi.com/2079-4991/9/6/850> (Year: 2019).*
Kim et al., "Piezoresistive sensor-integrated PDMS cantilever: A new class of device for measuring the drug-induced changes in the mechanical activity of cardiomyocytes", Sensors and Actuators B: Chemical, vol. 240, Mar. 2017, <https://www.sciencedirect.com/science/article/pii/S0925400516314009> (Year: 2017).*
Wang et al., "Ag/CNT-PDMS crack sensing for measuring contractility of cardiomyocytes", 2022 International Conference on Manipulation, Automation and Robotics at Small Scales (MARSS), Jul. 2022, <https://ieeexplore.ieee.org/document/9870457> (Year: 2022).*
Wei et al., "Advances in Multidimensional Cardiac Biosensing Technologies: From Electrophysiology to Mechanical Motion and Contractile Force", Nano Micro Small, vol. 16, Iss 50, Nov. 23, 2020, <https://onlinelibrary.wiley.com/doi/10.1002/smll.202005828> (Year: 2020).*

* cited by examiner

CRACK SENSOR, PREPARATION METHOD THEREFOR, AND APPLICATION THEREOF IN MICRO-FORCE MEASUREMENT

CROSS-REFERENCE TO RELATED APPLICATIONS

The present invention claims priority to a Chinese patent application submitted to the China National Intellectual Property Administration on Jul. 15, 2022, with an application number 202210833004.2, titled "crack sensor, preparation method therefor, and application thereof in contractile force measurement". The entire contents of this Chinese patent application are incorporated herein by reference.

TECHNICAL FIELD

The present invention belongs to the technical field of electronic core industry, relates to sensitive elements and sensor manufacturing, in particular to a crack sensor, preparation method therefor, and application thereof in contractile force measurement.

BACKGROUND OF THE INVENTION

The disclosure of the background art section is intended solely to enhance the understanding of the general background of the present invention and should not necessarily be regarded as an admission or implied acknowledgment that the information constitutes prior art known to those skilled in the art.

Accurate measurement of micro-forces is of significant importance in multiple fields, such as biomechanics and materials science. Currently, micro-force measurements primarily rely on high-precision mechanical sensors; however, traditional sensors often suffer from insufficient sensitivity and poor stability. Particularly, existing technologies struggle to achieve both high sensitivity and high stability simultaneously in micro-force measurements. The contractile force of cardiomyocytes is a typical example of such micro-forces, and its measurement is crucial for cardiac drug development and cardiovascular disease diagnosis.

Through the research conducted by the inventors, it has been discovered that encapsulating a metal crack sensor within a rubber cantilever can effectively detect the contractile motion generated by cardiomyocytes (CM). During the detection process, the cracks in the metal crack sensor undergo a reversible breaking and reconnection process at the junctions of the metal layer, resulting in rapid changes in the resistance of the crack sensor. However, the inventors have further found that such contractile motion of CM results in bending cracks in the Ag layer. During the recovery phase of contraction, these cracks undergo repeated changes, causing crack propagation and thereby reducing the stability of the crack sensor.

SUMMARY OF THE INVENTION

To address the shortcomings of the prior art, the present invention aims to provide a crack sensor, preparation method therefor, and application thereof in micro-force measurement. The crack sensor provided by the present invention effectively resists crack propagation, significantly improves the stability of the crack sensor, and exhibits high sensitivity.

The micro-forces referred to in the present invention specifically indicate forces within the range of 0.1-10 kPa, with typical applications including, but not limited to, the measurement of cardiomyocyte contractile forces. The crack sensor provided by the present invention demonstrates excellent measurement performance within this range.

To achieve the above objective, the technical solutions of the present invention are as follows:

In one aspect, the present invention provides a crack sensor comprising a flexible film, wherein a first side of the flexible film is provided with a plurality of linear protrusions, and an opposite second side of the flexible film is configured with a linear structure; the linear structure comprises, in order from bottom to top, a silver layer, a chromium layer, and a CNT-PDMS layer, wherein the CNT-PDMS layer is composed of polydimethylsiloxane (PDMS) doped with carbon nanotubes (CNT); the silver layer is configured with a crack structure, the crack structure being a crack that changes in response to the deformation of the silver layer.

The linear structure is arranged on the flexible film, allowing the micro-force such as contractile force of cardiomyocytes (CM) to be transmitted through the flexible film to the linear structure. This transmission causes the silver layer in the linear structure to deform, thereby causing changes in the cracks. These changes in the cracks enable rapid changes in the resistance of the crack sensor. Meanwhile, the linear structure is provided with a CNT-PDMS layer, wherein the CNTs embedded in the PDMS form bridges that effectively resist crack propagation, thereby significantly enhancing the stability of the crack sensor. The purpose of providing a plurality of linear protrusions in the present invention is to facilitate cell cultivation. To enhance the adhesion between the CNT-PDMS layer and the silver layer, a chromium layer is disposed between the CNT-PDMS layer and the silver layer.

In another aspect, the present invention provides a method for preparing the crack sensor as described above, wherein the method comprises: coating a photoresist layer on a surface of a substrate; etching a plurality of microchannels on a surface of the photoresist layer; coating a layer of polydimethylsiloxane (PDMS) on the same surface, and curing to obtain a PDMS layer, wherein the PDMS layer has a first face with a plurality of linear protrusions and a second face that is smooth; covering the second face of the PDMS layer with a template having linear through-holes; successively forming a silver layer, a chromium layer, and a CNT-PDMS layer on a side of the template; removing the template to obtain the crack sensor.

In a third aspect, the present invention provides a crack sensing device, comprising the above-described crack sensor, a support, and a cell culture component, wherein the crack sensor is positioned between the support and the cell culture component. The support is provided with a groove or through-hole, and the crack sensor covers the groove or through-hole. A portion or the entirety of the linear structure of the crack sensor is located within the groove or through-hole.

In a fourth aspect, the present invention provides an application of the above-described crack sensor or crack sensing device in micro-force measurement. The micro-forces referred to herein include contractile forces, especially those generated by cardiomyocytes.

In a fifth aspect, the present invention provides an application of the above-described crack sensor or crack sensing device in the preparation of cardiac drugs.

Beneficial Effects of the Present Invention

The crack sensor provided by the present invention integrates the Ag layer and the CNT-PDMS layer. The contractile motion of cardiomyocytes (CM) induces bending cracks in the Ag layer, and Ag islands are bridged by CNTs doped within the PDMS. This structure effectively resists crack propagation, significantly improving the stability of the crack sensor (with a stability cycle exceeding 2,000,000 cycles). Compared with the stable conductive network of the CNT-PDMS layer, the disconnection and reconnection of Ag cracks enable rapid changes in the conductive network, resulting in high sensitivity with a gauge factor of up to 108,241.7.

BRIEF DESCRIPTION OF DRAWINGS

The accompanying drawings to the specification, which form part of the present invention, are used to provide a further understanding of the present invention, and the illustrative examples of the present invention and the description thereof are used to explain the present invention and are not unduly limiting the present invention.

FIG. 1A: (i) A schematic diagram shows the crack sensor integrated onto a thin PDMS film with microchannels for measuring CM contractility. (ii) The working principle of the crack sensor is demonstrated, where CM contractility causes bending cracks in the Ag layer, and the Ag islands are bridged by CNTs doped into the PDMS.

FIG. 1B: (i) The four components of the device array for contractility detection are shown. (ii) An SEM image of the PDMS surface with microchannels is presented, which facilitates the anisotropic growth of CMs (scale bar: 10 μm). (iii) The CMs cultured on the PDMS surface with microchannels are displayed (scale bar: 70 μm).

FIG. 1C: Manufacturing sequence: (i) A 2.5 cm×2.5 cm glass slide is treated on its surface using $O_2$ plasma. (ii) Microchannels with a width of 3 μm and a depth of 2 μm are fabricated on the surface of the photoresist using soft lithography. (iii) PDMS (10 μm thick) is spin-coated onto the photoresist mold with the microchannels. (iv) A 100 nm thick Ag layer and a 5 nm thick Cr layer are deposited onto the back of the PDMS film via vacuum evaporation. (v) A 10 μm thick CNT-PDMS layer is deposited on the surface of the Ag layer using screen printing. (vi) A 3 μm thick Ag electrode is used to connect the wires, and the crack sensor is pre-stretched at a strain of 2%. (vii) A PDMS base component is cast. (viii) The PDMS support part and the glass slide are bonded together via $O_2$ plasma treatment. (ix) A glass tube with an inner diameter of 1.1 cm is prepared. (x) The PDMS support part, the thin film component, and the glass tube are bonded together.

FIG. 1D: Illustrates the changes in the contact angle of the PDMS film under different $O_2$ plasma treatment durations (0 s, 90 s, and 120 s), demonstrating that the hydrophilicity of the PDMS surface significantly improved with increasing treatment time.

FIG. 1E: The experimental platform is used for characterizing the Ag/CNT-PDMS crack sensor under tensile strain.

FIG. 2A: Noise and signal-to-noise ratio (SNR) of Ag/CNT-PDMS crack sensors with different CNT weight ratios under 0.01% strain.

FIG. 2B: $\Delta R/R_0$-strain curves of Ag/CNT-PDMS crack sensors with different CNT weight ratios. The inset shows the front and back optical images of a dumbbell-shaped Ag/CNT-PDMS crack sensor used for tensile testing (scale bar: 10 mm).

FIG. 2C: $\Delta R/R_0$-strain curves of Ag/CNT-PDMS crack sensors with different CNT weight ratios in the strain range of 0-1%.

FIG. 2D: Stability of the crack sensor under 0.5% strain during 2,000,000 tensile-release cycles. The inset shows the magnified response curve of the tensile-release cycles.

FIG. 2E: Hysteresis curve of the crack sensor under 0.5% strain during 2,000,000 tensile-release cycles. The inset shows the changes in the gauge factor (GF) and the square of the correlation coefficient ($R^2$) with increasing tensile-release cycles.

FIG. 2F: $\Delta R/R_0$ responses of the crack sensor under continuous varying strain amplitudes of 0.1%, 0.2%, 0.3%, 0.4%, and 0.5%, repeated four times.

FIG. 2G: $\Delta R/R_0$-time curves of the crack sensor under 0.5% strain at frequencies of 0.5 Hz, 1 Hz, 2 Hz, 3 Hz, and 4 Hz.

FIG. 2H: Temperature drift test of the crack sensor.

FIG. 3A: Measurements of CM contractility over 14 days using the crack sensor and a commercial silicon strain sensor.

FIG. 3B: Beating rates of CMs at different maturation stages, statistically derived from the signals of the crack sensor and the silicon strain sensor.

FIG. 3C: Comparison of CM contractility waveforms recorded on different days using the crack sensor and the commercial silicon strain sensor.

FIG. 3D and FIG. 3E: Rise and fall times of the CM beating waveforms at different maturation stages, statistically obtained from the crack sensor and the commercial silicon strain sensor.

FIG. 3F: $\Delta R/R_0$ amplitudes of CM contractility measured using the crack sensor and the commercial silicon strain sensor on days 4, 7, 10, and 13.

FIG. 3G: Pneumatic calibration setup.

FIG. 3H: Calibration relationship between $\Delta R/R_0$ and sensor pressure before and after CM culture.

FIG. 3I: Contractile stress of CMs on different days.

FIG. 4A: $\Delta R/R_0$ changes of CMs cultured on the crack sensor at different concentrations of verapamil (0.01 nM to 1 μM).

FIG. 4B and FIG. 4C: Contractile stress and beating rate of CMs after treatment with verapamil.

FIG. 4D: Dose-response curve of CM contractile force under verapamil treatment, with an apparent $EC_{50}$ of $8.029 \times 10^{-7}$ M.

FIG. 4E: Dose-response curve of CM beating rate under verapamil treatment, with an apparent $EC_{50}$ of $9.210 \times 10^{-7}$ M.

FIG. 4F: Changes in CMs cultured on the crack sensor after treatment with isoproterenol at different concentrations (0.1 nM to 1 μM).

FIG. 4G and FIG. 4H: Contractile stress and beating rate of CMs after treatment with isoproterenol.

FIG. 4I: Dose-response curve of CM contractile force under isoproterenol treatment, with an apparent $EC_{50}$ of $9.262 \times 10^{-8}$ M.

FIG. 4J: Dose-response curve of CM beating rate under isoproterenol treatment, with an apparent $EC_{50}$ of $7.144 \times 10^{-8}$ M.

DESCRIPTION OF THE PREFERRED EMBODIMENTS

Figure 1A:
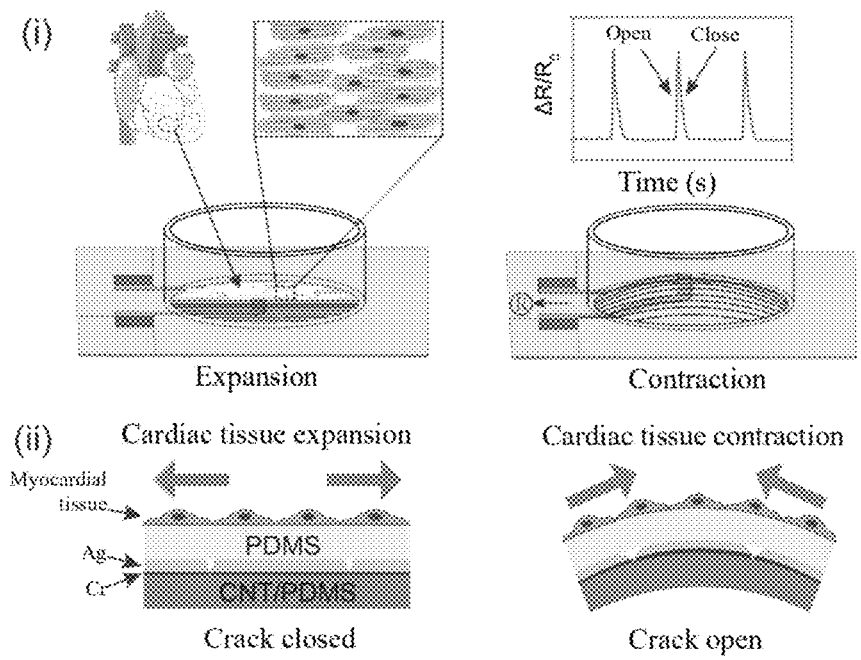
FIG. 1A to FIG. 1E illustrate the high-sensitivity and high-stability crack sensor for detecting CM contractility in the embodiments of the present invention.

It should be noted that the following detailed descriptions are all illustrative and intended to provide further clarification of the present invention. Unless otherwise specified, all technical and scientific terms used herein shall have the meanings generally understood by those skilled in the relevant technical field to which this invention pertains.

It should be noted that the terminology used here is for the purpose of describing particular embodiments only and is not intended to be limiting of the exemplary embodiments of the invention. As used herein, unless explicitly stated otherwise, the singular form is intended to include the plural form as well. Additionally, it should be understood that when the terms "comprising" and/or "including" are used in this specification, they indicate the presence of features, steps, operations, devices, components, and/or their combinations.

As described in the background art, existing crack sensors suffer from deficiencies such as poor stability caused by crack propagation. To address these technical issues, the present invention proposes a crack sensor, preparation method therefor, and application thereof in micro-force measurement.

A typical embodiment of the present invention provides a crack sensor comprising a flexible film, wherein a first side of the flexible film is provided with a plurality of linear protrusions, and an opposite second side of the flexible film is configured with a linear structure; the linear structure comprises, in order from bottom to top, a silver layer, a chromium layer, and a CNT-PDMS layer, wherein the CNT-PDMS layer is composed of polydimethylsiloxane doped with carbon nanotubes; the silver layer is configured with a crack structure, the crack structure being a crack that changes in response to the deformation of the silver layer.

Studies have shown that the crack sensor provided by the present invention exhibits advantages of high stability and sensitivity in detecting the micro-force such as contractile force of cardiomyocytes.

In some embodiments, the flexible film is a polydimethylsiloxane film. The polydimethylsiloxane film has a thickness of 5-20 μm.

In some embodiments, the silver layer has a thickness of 90-110 nm.

In some embodiments, the chromium layer has a thickness of 2-10 nm.

In some embodiments, the CNT-PDMS layer has a thickness of 5-20 μm.

In some embodiments, the CNT-PDMS layer contains carbon nanotubes in an amount of 0.01-5 wt %. When the amount of carbon nanotubes is 2-4 wt % (particularly 2.5-3.5 wt %), the sensing performance is improved. The carbon nanotubes have a diameter of 8-15 nm and a length of 3-12 μm.

In some embodiments, the CNT-PDMS layer is connected to electrodes.

The linear structure may be linear, curved, or other shapes. In some embodiments, the linear structure is U-shaped. The U-shaped linear structure is more convenient for connecting circuits.

Another embodiment of the present invention provides a method for preparing the aforementioned crack sensor. The method comprises: coating a photoresist layer on a surface of a substrate; etching a plurality of microchannels on a surface of the photoresist layer; coating a layer of polydimethylsiloxane (PDMS) on the same surface, and curing to obtain a PDMS layer, wherein the PDMS layer has a first face with a plurality of linear protrusions and a second face that is smooth; covering the second face of the PDMS layer with a template having linear through-holes; successively forming a silver layer, a chromium layer, and a CNT-PDMS layer on a side of the template; removing the template to obtain a structure, and pre-stretching the structure to obtain the crack sensor.

In some embodiments, the substrate is glass, and before coating the photoresist layer, the substrate is treated with $O_2$ plasma.

In some embodiments, the silver and chromium layers are formed by vacuum evaporation.

In some embodiments, the CNT-PDMS layer is formed on the surface of the chromium layer by screen printing.

In some embodiments, pre-stretching is performed under a strain of 1.5-2.5%.

A third embodiment of the present invention provides a crack sensing device, comprising the crack sensor described above, a support, and a cell culture component. The crack sensor is positioned between the support and the cell culture component, with the support provided with a groove or through-hole. The crack sensor covers the groove or through-hole, and a portion or all of the linear structure of the crack sensor is located within the groove or through-hole.

The cell culture component of the present invention may be a glass tube, where one end of the glass tube is bonded to the crack sensor, forming a cavity for cell culture between the crack sensor and the glass tube.

In some embodiments, the crack sensing device includes a glass substrate, and the support is bonded to the glass substrate. The glass substrate is treated with $O_2$ plasma.

In some embodiments, the support is also treated with $O_2$ plasma.

The fourth embodiment of the present invention provides an application of the aforementioned crack sensor or crack sensing device in micro-force measurement. The micro-forces referred to herein include contractile forces, especially those generated by cardiomyocytes.

In some embodiments, the application is in the measurement of the contractile force of cardiomyocytes.

Abnormal cardiac contractility can lead to heart failure, atrial fibrillation, and other cardiovascular diseases. Therefore, the application described in the present invention can be used for disease diagnosis and treatment, as well as for scientific research purposes unrelated to disease diagnosis or treatment. Additionally, it can be employed in the development of medical devices for cardiac monitoring.

The present invention further applies the aforementioned crack sensor or crack sensing device to the analysis of drug efficacy. Studies have shown that cardiac drugs can regulate the excitation-contraction coupling process to influence the contractile behavior of CM, thereby enabling the quantification of drug effects. This facilitates both the screening of effective drugs and the evaluation of drug dosages, making it applicable in the process of developing cardiac drugs. Accordingly, the fifth embodiment of the present invention provides an application of the aforementioned crack sensor or crack sensing device in the development of cardiac drugs.

To enable those skilled in the art to better understand the technical solutions of the present invention, the following will provide a detailed description of the technical solutions in conjunction with specific examples.

EXAMPLES

Figure 1B:
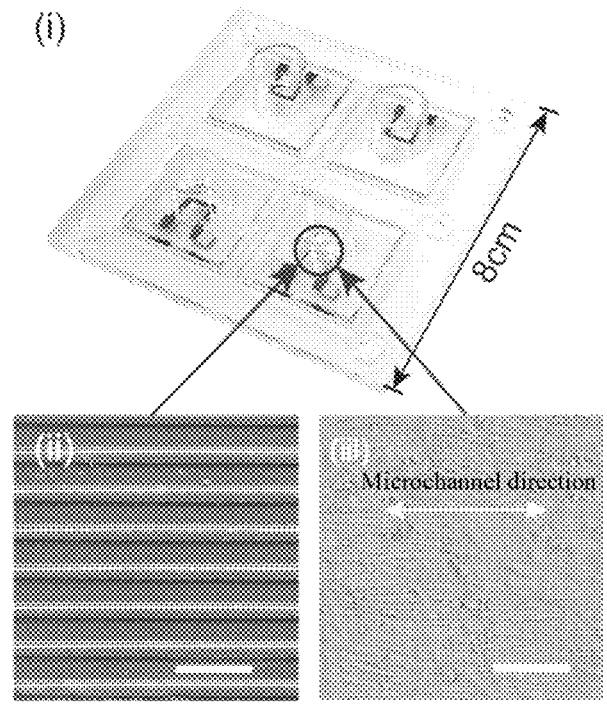
Figure 1C:
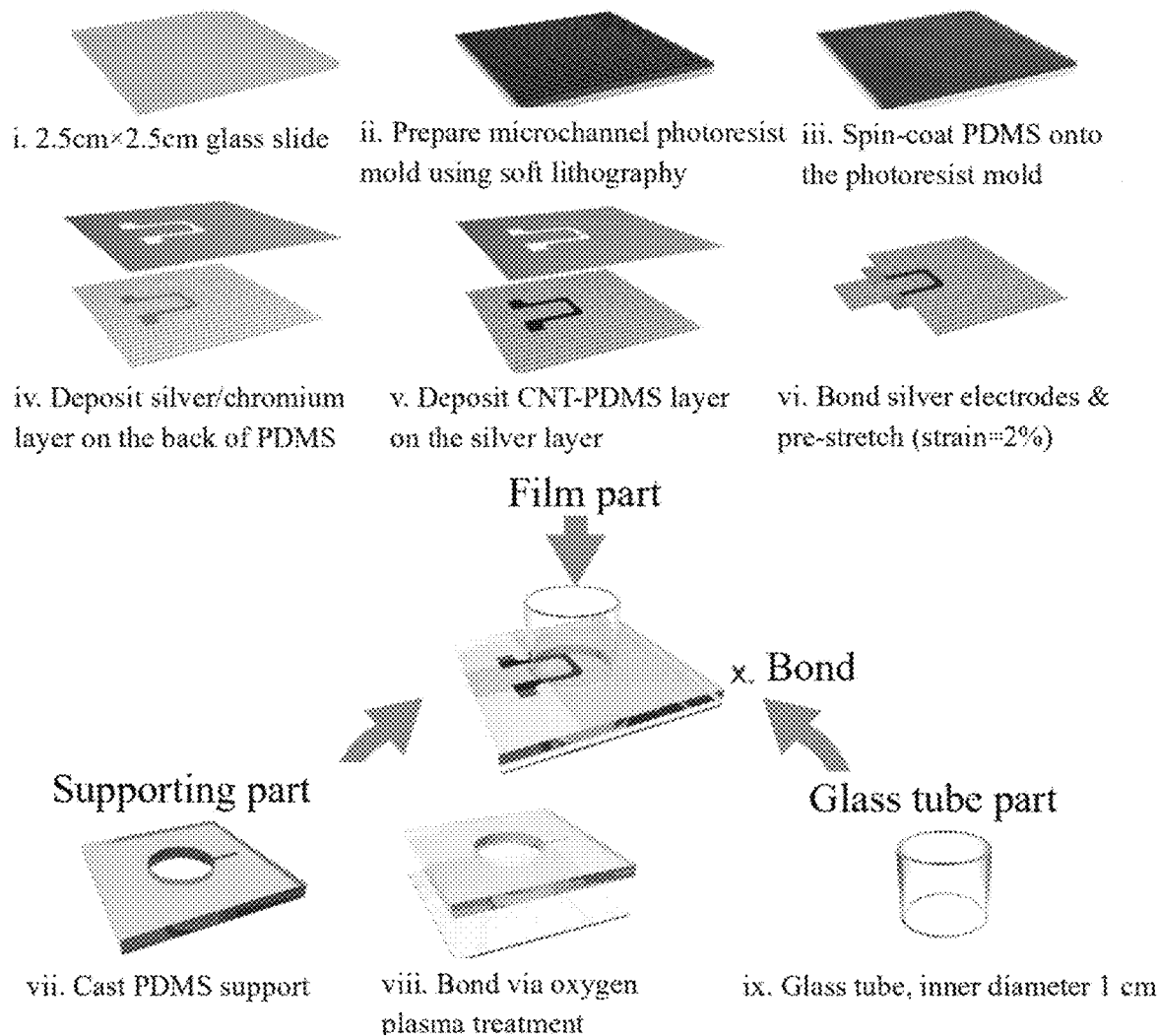

Fabrication of Ag/CNT-PDMS Crack Sensor:

A manufacturing process for a micro-force measurement device integrated with a crack sensor is shown in FIG. 1C. The device primarily consisted of three components: a crack sensor integrated into a PDMS film, a PDMS support section, and a glass tube section for cell culture. To fabricate the crack sensor integrated onto the PDMS thin film, a 2.5 cm×2.5 cm glass slide was cleaned with anhydrous ethanol and treated with $O_2$ plasma (Zhengzhou Chengyue Science Instruments Co., Ltd., CY-P2L-B) at a power of 100 W for 120 seconds. 0.5 g of photoresist (AZ-4620) was uniformly spin-coated onto the surface of the glass slide at a speed of 1400 r/min for 1 min. After baking at 60° C. for 60 min and cooling to room temperature, a mask with a microchannel pattern was coated on the glass slide. The photoresist was exposed for 3 seconds and developed for 10 seconds, forming microchannels with a width of 3 μm and a depth of 2 μm on the surface of the photoresist. 0.5 g of PDMS solution (curing agent and PDMS polymer, Sylgard 184, Dow Corning, at a 1:10 ratio) was spin-coated at 8,500 r/min on the surface with microchannels for 1 min. The PDMS was cured for 2 hours to obtain a film with a thickness of 10 μm. Then, the back surface of the PDMS film (i.e. the side opposite to the microchannels) was treated with $O_2$ plasma for 120 seconds. A mask with a 10 μm thick "U-shaped" through-hole structure was then placed on the back surface of the PDMS film. Using a vacuum evaporator (Angstrom Engineering), Ag/Cr films with thicknesses of 100 nm and 5 nm, respectively, were deposited onto the back surface of the PDMS film. The U-shaped structure allowed the electrodes to be located at one end of the measurement device, facilitating the connection to external circuits. Carbon nanotubes (CNT, diameter: 8-15 nm, length: 3-12 μm, Tanfeng Technology) and PDMS (Sylgard 184, Dow Corning) were mixed at a weight ratio of 3:97 using a magnetic stirrer (Sedulis 85-2A) for 12 hours. After treating the PDMS surface with $O_2$ plasma for 120 seconds, a 10 μm thick CNT-PDMS strip was screen-printed onto the surface of the Ag layer. The mask with "U-shaped" through-hole structure was then removed, and Ag electrodes were used to connect the CNT-PDMS strips. To generate uniform silver cracks in the sensor, the film was pre-stretched under 2% strain. A PDMS support with dimensions of 2.5 cm×2.5 cm×2 mm was prepared using a casting method. A vent hole (5 mm×0.5 mm×0.5 mm) was designed at the bottom to calibrate the pressure P with respect to $\Delta R/R_0$. The square glass (2.5 cm×2.5 cm) and the PDMS support section were sealed via $O_2$ plasma treatment. Finally, the PDMS film with the integrated crack sensor was bonded to the PDMS support section and the glass tube section using PDMS adhesive.

Calibration of the Crack Sensor:

To measure the contraction stress of CMs, a relationship between the relative resistance change ($\Delta/_0$) of the crack sensor and the surface pressure of the film needed to be established. For device calibration, a syringe pump (LSP syringe pump, LSP02-1B) and a 1 ml syringe were used to apply pressure (FIG. 4G). A digital pressure gauge (Smart, GM 505) was used to measure the pressure applied by the syringe pump. The syringe pump delivered pressures ranging from 0.5 kPa to 5 kPa through a single inlet at an injection rate of 5 mL/min, causing the PDMS film to bulge. At the same time, a constant voltage of 2.5 V was applied to each Ag/CNT-PDMS crack sensor, and a digital multimeter (GWINSTEK, GDM-9061) collected resistance signals at a sampling rate of 50 Hz. Before calibration, the Ag/CNT-PDMS crack sensor was pre-stretched under 2% strain for 24 hours to ensure reproducible resistance signals.

The Ag/CNT-PDMS crack sensor was integrated into a thin PDMS film with microchannels for CM culture (FIG. 1A and FIG. 1B). The contraction and relaxation of CMs caused deflections in the PDMS film, see step (i) in FIG. 1A. The cracks in the sensor opened and closed accordingly, resulting in resistance changes, see step (ii) in FIG. 1A. Additionally, microchannels (3 μm wide and 2 μm deep) were fabricated to enable CMs to mimic the anisotropic growth of myocardial structures and synchronized contraction of cardiomyocytes in vivo.

Figure 1D:
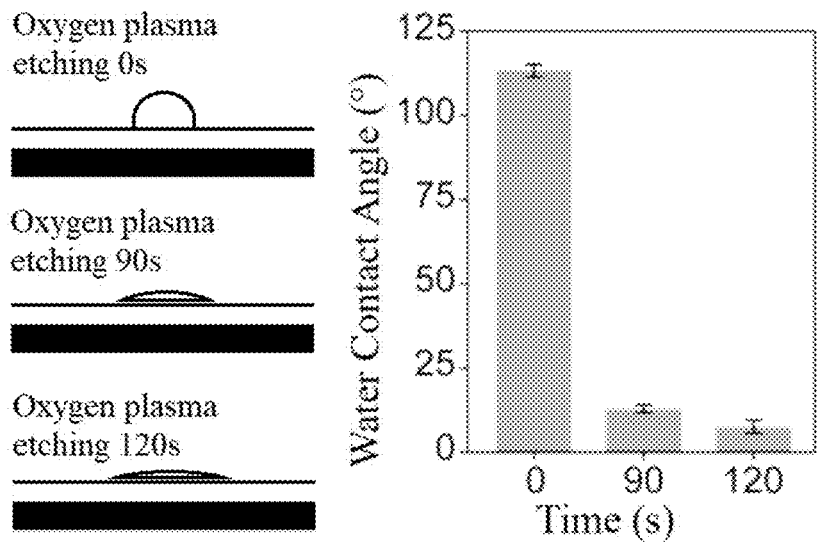

Reducing the hydrophobic angle of the PDMS film increased surface energy and enhanced CM adhesion. After $O_2$ plasma treatment for 0 seconds, 90 seconds, and 120 seconds, the hydrophobic angle of the PDMS film with microchannels decreased from 122.35° to 8.17°, demonstrating improved hydrophilicity of the PDMS (FIG. 1D).

Characterization of Crack Sensors:

1. Signal-to-Noise Ratio (SNR), Sensitivity, Operating Range and Stability

Figure 1E:
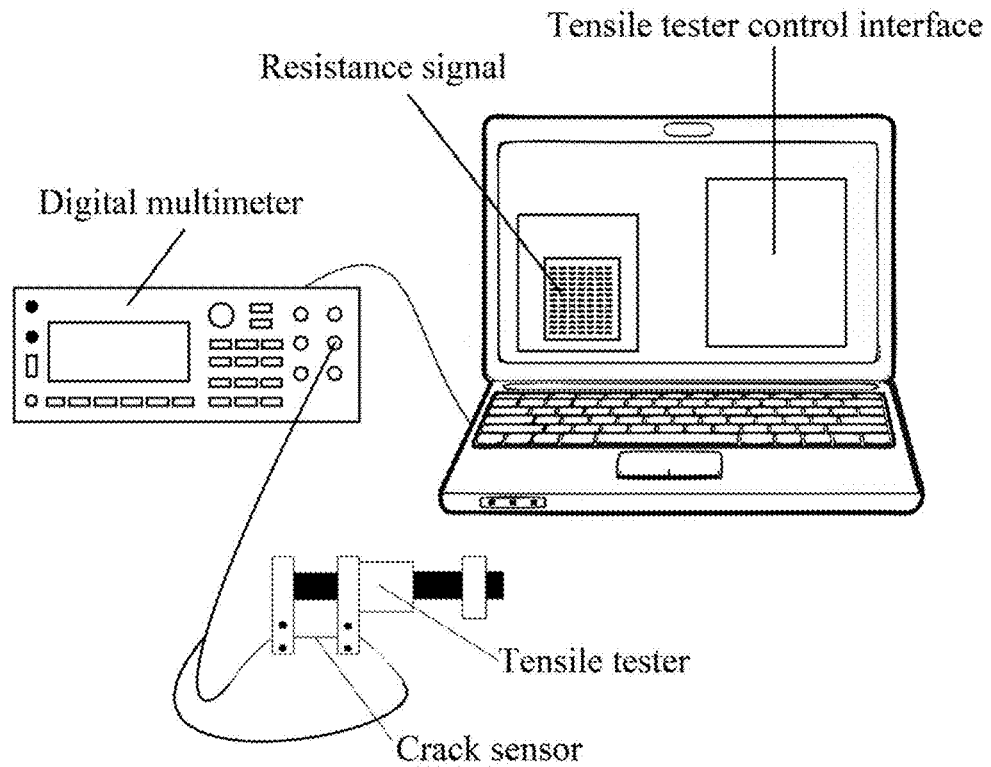
Figure 2A:
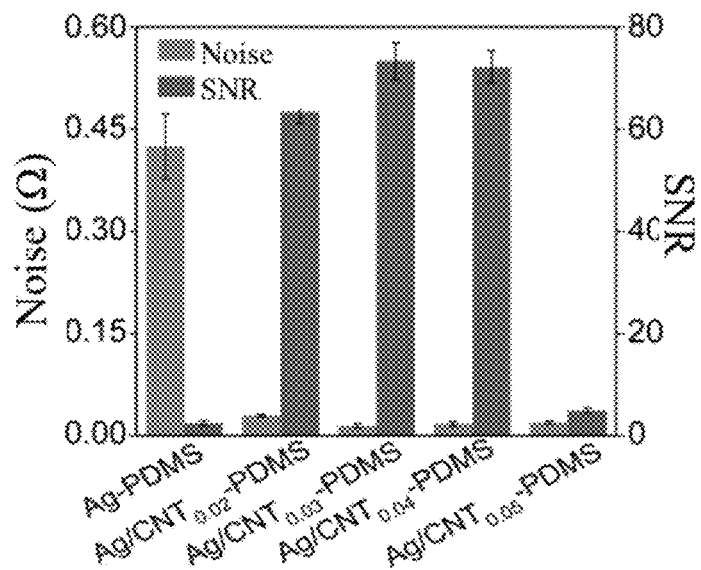
FIG. 2A to FIG. 2H: Characterization of the crack sensor prepared in the examples of the present invention.
Figure 2B:
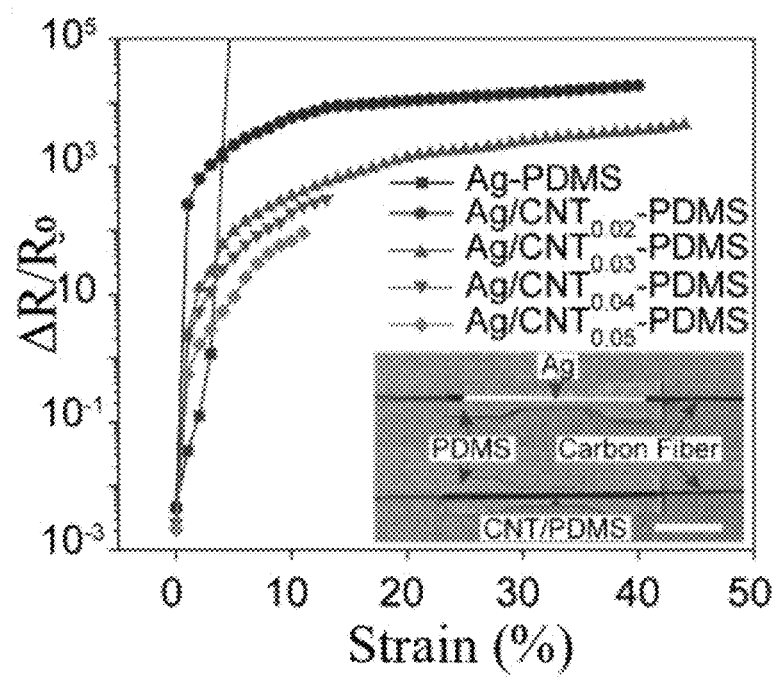
Figure 2C:
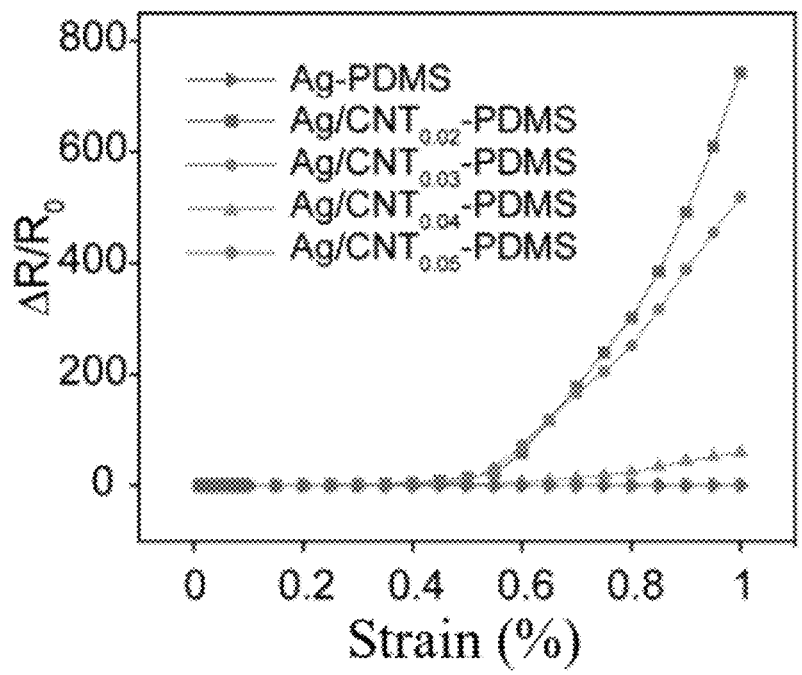

In order to maximize the sensing performance (such as SNR, sensitivity, and stability) of the Ag/CNT-PDMS crack sensor, the CNT weight ratio (0-5 wt. % CNT) near the percolation threshold was selected to adjust the conductive connection between Ag/Cr cracks and optimize the piezoresistive performance of the Ag/CNT-PDMS crack sensor, and the adopted experimental platform is shown in FIG. 1E. As shown in FIG. 2A and FIG. 2B, the noise level of the crack sensor significantly decreased with the addition of carbon nanotubes (CNT). Compared with the crack sensor without CNT (Ag-PDMS), the noise level of the Ag/CNT-PDMS crack sensor dropped from 0.425Ω to 0.015Ω (approximately 23-fold reduction), while the SNR increased from 2.5 to 73.4 (approximately 28-fold increase) at 0.01% strain, as shown in FIG. 2A.

The working range of Ag-PDMS crack sensors without CNT (0 wt. %) was between 0.01% and 4% strain. In contrast, the working range of Ag/CNT-PDMS crack sensors doped with different CNT weight ratios was significantly improved. For example, the maximum working range of the Ag/$CNT_{0.03}$-PDMS crack sensor (doped with 3 wt. % CNT) reached 44%, as shown in FIG. 2B. In the small strain range (strain <1%, which corresponds to the maximum range of CM beating), the gauge factor of the Ag-PDMS crack sensor was 36.01. In comparison, the gauge factors of the Ag/$CNT_{0.02}$-PDMS and Ag/$CNT_{0.03}$-PDMS crack sensors at the same strain reached 166,099.0 and 108,241.7, respectively, as shown in FIG. 2B. These values are 4,612-fold and 3,005-fold higher than that of Ag-PDMS, demonstrating a significant improvement in sensitivity.

Figure 2D:
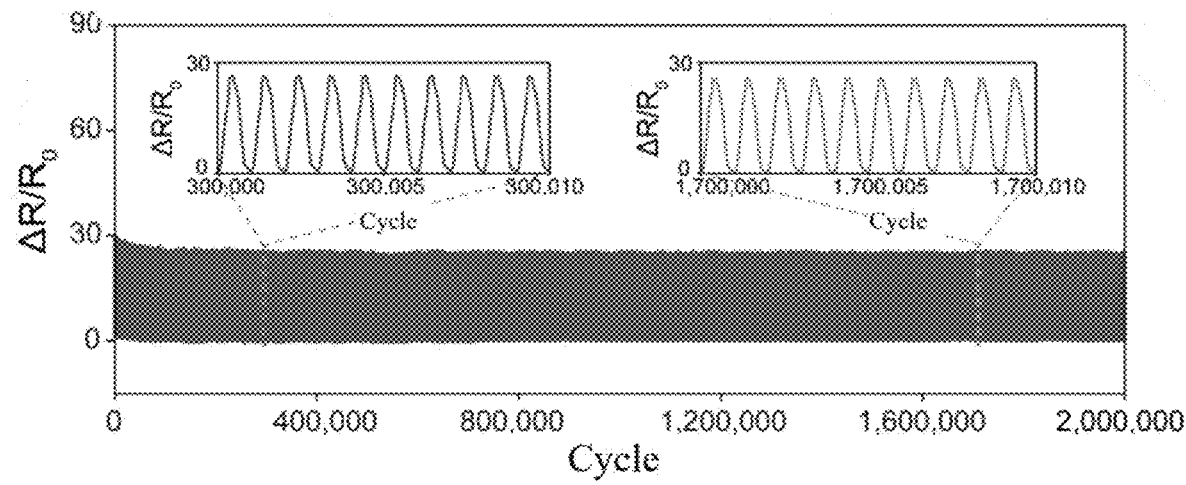
Figure 2E:
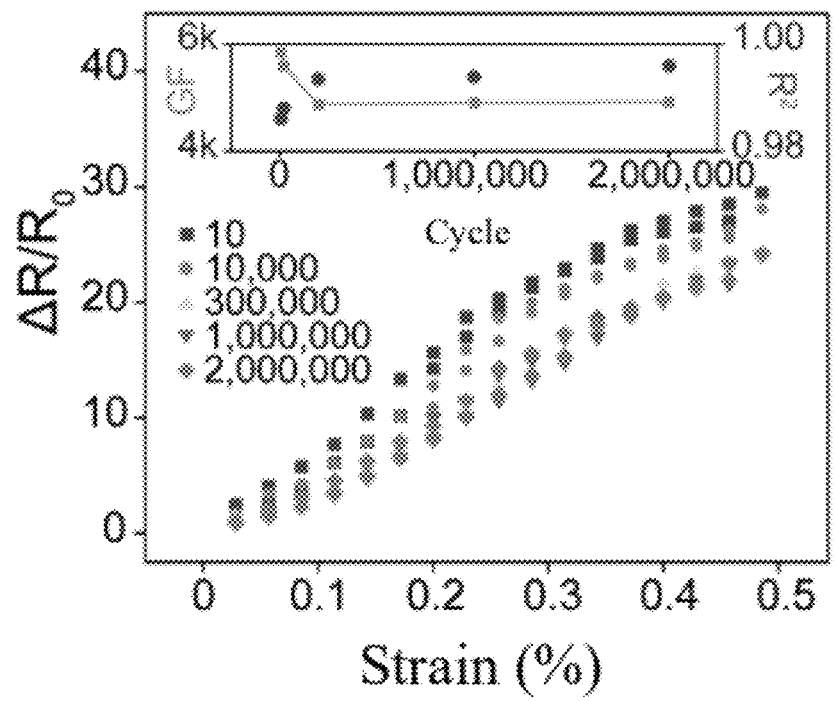

To achieve long-term stable detection of CM contractility (>14 days, or >1,500,000 beating cycles), it was necessary to ensure that the crack sensor would not experience fatigue failure. For this purpose, a cyclic tensile release test of 2,000,000 cycles was conducted at a rate of 50 μm/s and 0.5% strain. For the Ag-PDMS crack sensor without CNT, monitoring of ΔR/R0 showed device instability after 20,000 cycles, which might be attributed to the continuous expansion of Ag cracks along the vertical stretching direction until fatigue occurred. In contrast, the $\Delta R/R_0$ of the Ag/$CNT_{0.03}$-PDMS crack sensor exhibited high stability due to the bridging effect between CNT and Ag islands, as shown in FIG. 2D.

2. Continuous Amplitude Response, Frequency Response, and Temperature Response

Figure 2F:
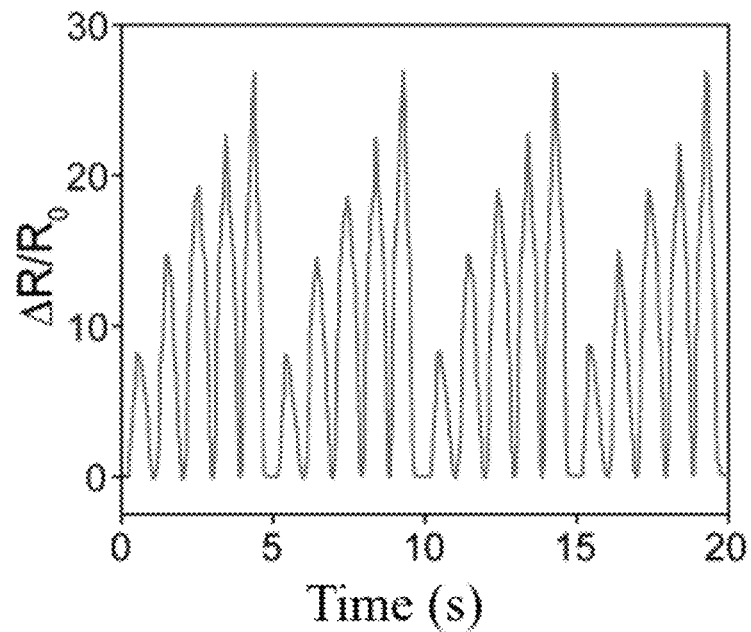
Figure 2G:
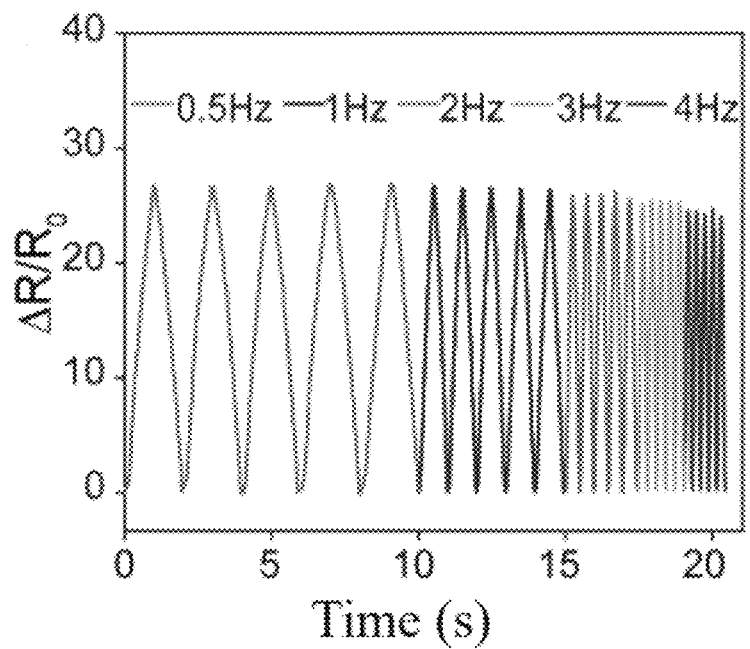
Figure 2H:
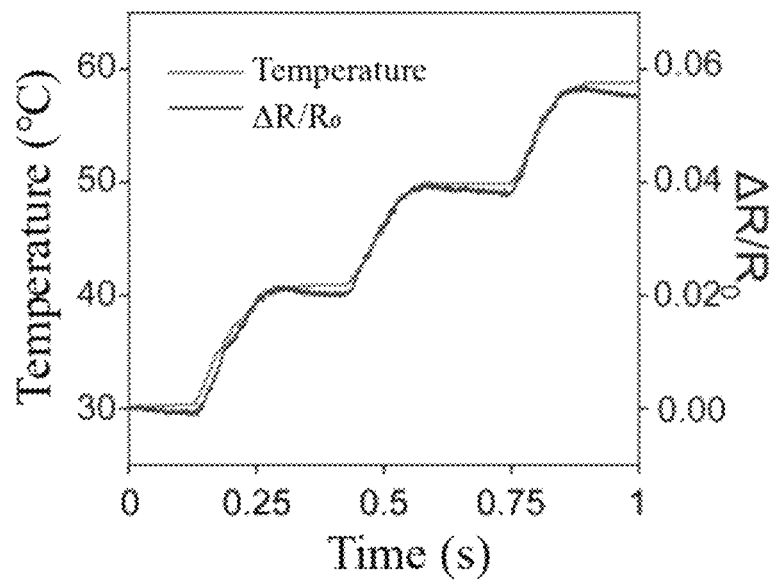

Due to the continuously changing amplitude and frequency of CMs contraction during growth, it was necessary to verify the response of the Ag/CNT$_{0.03}$-PDMS crack sensor under dynamic strain and varying frequencies. As shown in FIG. 2F, the Ag/CNT$_{0.03}$-PDMS crack sensor exhibited a linear response, with the strain increasing continuously from 0.1% to 0.5%. Additionally, the sensor maintained consistent responses to repeated strains of the same magnitude. FIG. 2G showed the $\Delta R/R_0$ response of the crack sensor to a 0.5% strain at different frequencies (0.5-4 Hz). The $\Delta R/R_0$ peak value did not exhibit significant changes, indicating that the crack sensor is suitable for detecting frequency variations in CM contractility. To examine the effect of temperature changes on the crack sensor, the temperature was increased from 30° C. to 60° C. in 10° C. increments. It was observed that $\Delta R/R_0$ increased by a gradient of 0.02, as shown in FIG. 2H. This indicated that the resistivity of the crack sensor was affected by temperature drift. Subsequently, a 10-hour resistance stability test was conducted in an incubator at 37° C. The $R_0$ fluctuation of the Ag/CNT$_{0.03}$-PDMS crack sensor was less than 0.056%, demonstrating high stability.

Figure 3A:
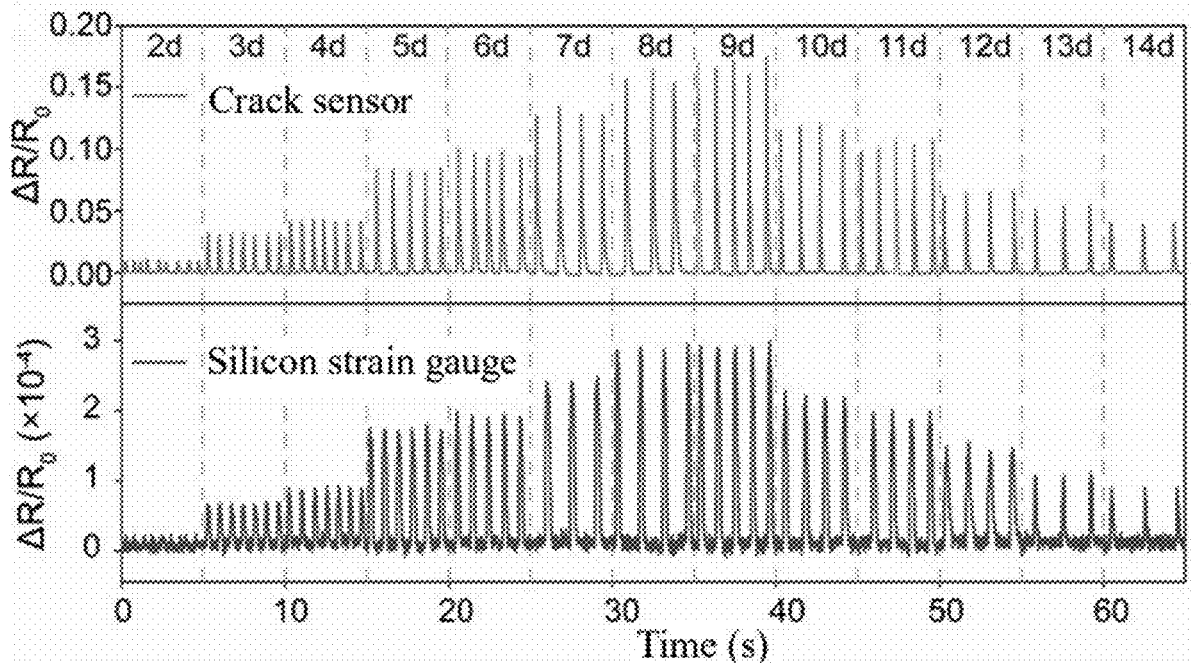
FIG. 3A to FIG. 3I: Results of CM contractility measurements using the crack sensor in the examples of the present invention.
Figure 3B:
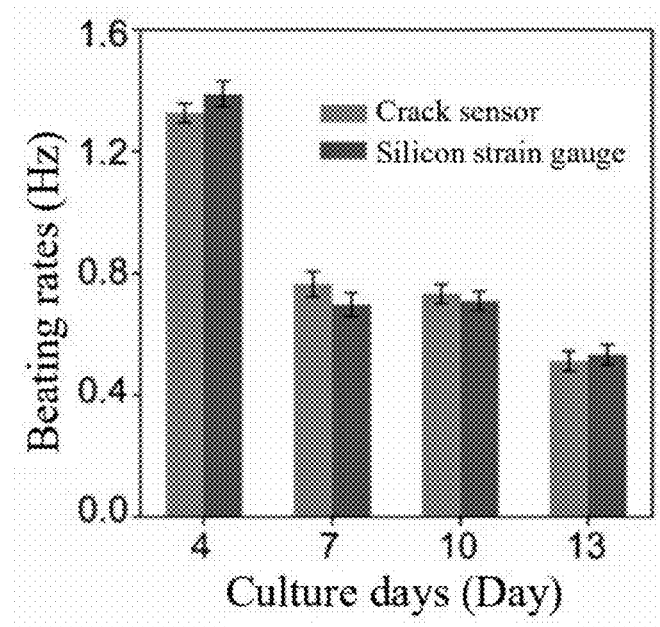
Figure 3C:
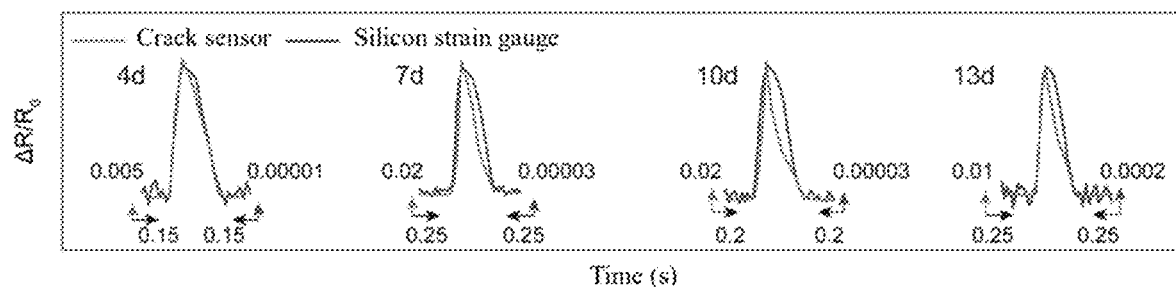
Figure 3D:
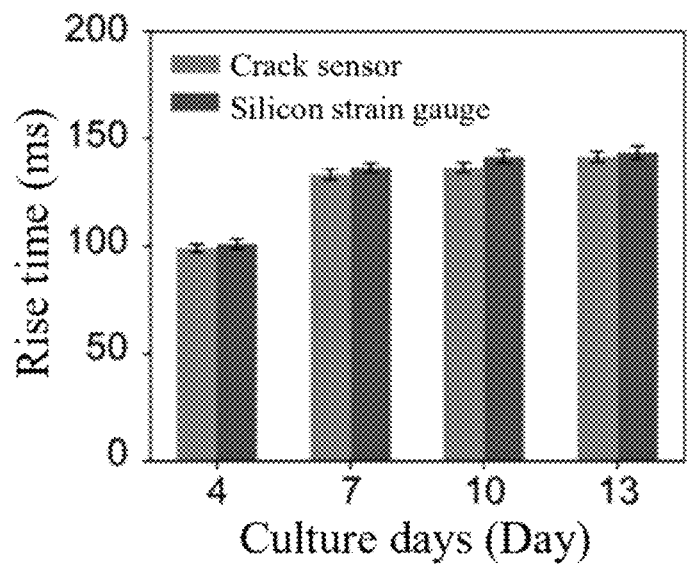
Figure 3E:
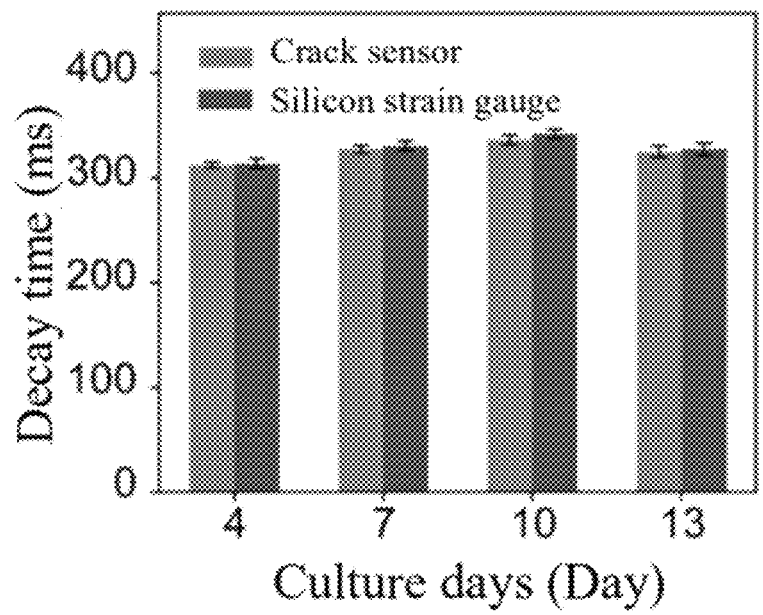
Figure 3F:
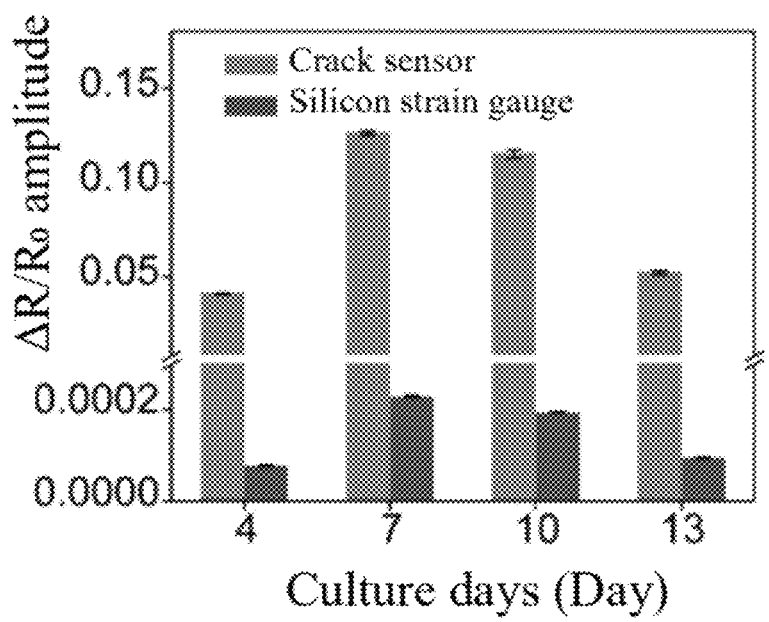

Measurement of CM Contractility:

Key parameters, including the $\Delta R/R_0$ trend, beating rate, rise time, and decay time, were measured using the crack sensor and a commercial silicon strain gauge. FIG. 3A showed the $\Delta R/R_0$ of the crack sensor and the commercial silicon strain gauge induced by CM contractility over a 14-day culture period. CM contractile activity was detected on day 2, and as the CM grew, the contractile force reached its maximum on day 8 and then decreased by day 14. The same pattern was observed in the beating rate and beating waveform, as shown in FIG. 3B and FIG. 3C. A comparison of beating waveforms over multiple days showed that the crack sensor's measured waveforms had shorter rise times (Day 10:134.91 ms vs. 140.15 ms) and decay times (Day 10:294.98 ms vs. 299.82 ms) compared to the silicon strain gauge, as shown in FIG. 3D and FIG. 3E. Additionally, the amplitude comparison of $\Delta R/R_0$ indicated that the amplitude of the crack sensor was over 520 times greater than that of the silicon strain gauge, as shown in FIG. 3F.

Figure 3G:
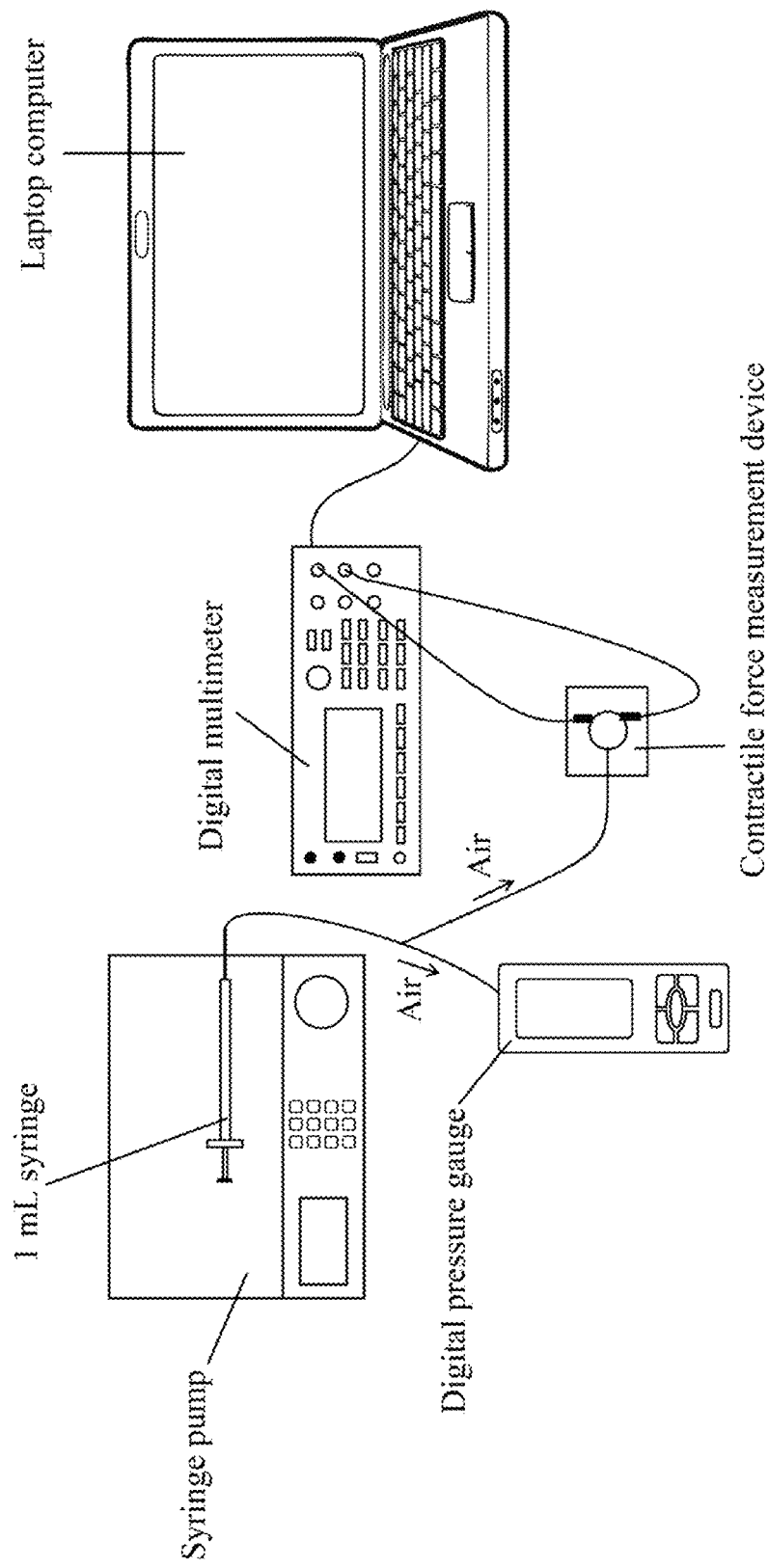
Figure 3H:
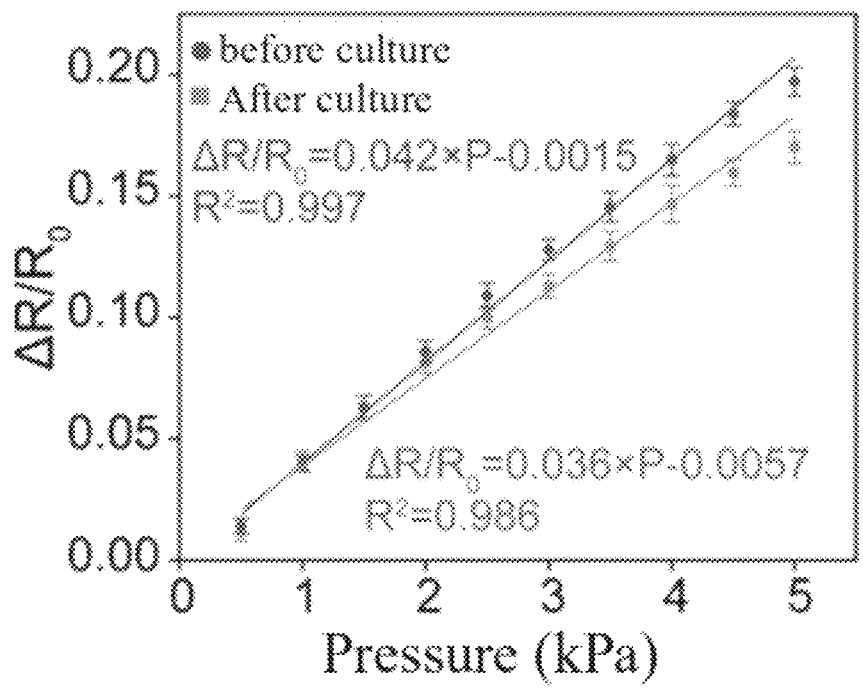
Figure 3I:
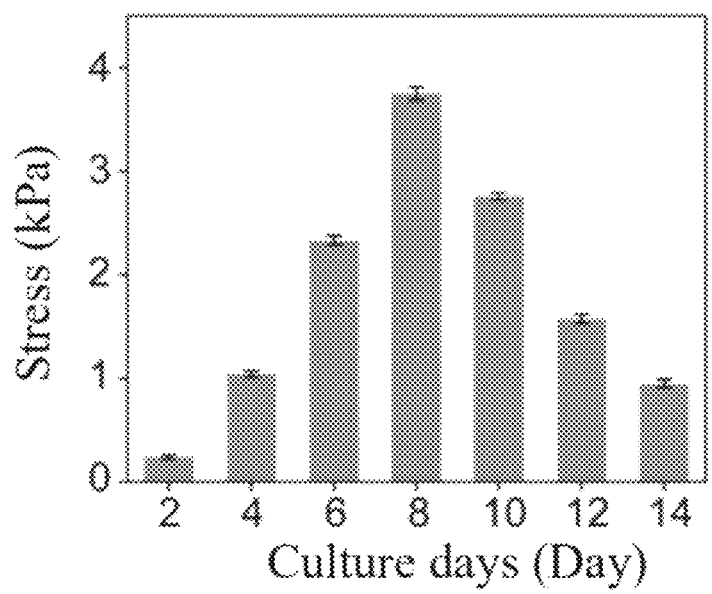

To explore the performance stability of the crack sensor in detecting CMs contractility, the contractility detection device integrated with the crack sensor was calibrated before and after the experiment. A syringe pump applied air pressure ranging from 0 to 5 kPa to expand the crack sensor in the PDMS film, as shown in FIG. 3G. The relationship between $\Delta R/R_0$ and pressure (P) was calibrated as $\Delta R/R_0 = 0.042 \times P - 0.0015$ ($R^2 = 0.997$, n=5 device units). The crack sensor was recalibrated after 14 days of CM culture, and $\Delta R/R_0$ maintained a good linear relationship with pressure, as shown in FIG. 4H. Based on the calibration results, as the CMs grew, the contractile stress of the CMs increased from 0.23±0.024 kPa (Day 2) to 3.75±0.063 kPa (Day 8) and then decreased as the CMs aged, as shown in FIG. 3I. The contractile stress of CMs decreased to 0.95±0.040 kPa on day 14.

Drug Evaluation:

The crack sensor was used to evaluate the effects of cardiac drugs. Two typical clinical drugs were tested, both of which regulated the excitation-contraction coupling process to influence the contractile behavior of CMs, demonstrating the effectiveness of the device in quantifying drug effects, as shown in FIG. 4A to FIG. 4J. Verapamil and isoproterenol acted on LTCC (L-type calcium channels) and β-adrenergic receptors, respectively, to affect CM contractility and beating rate.

Figure 4A:
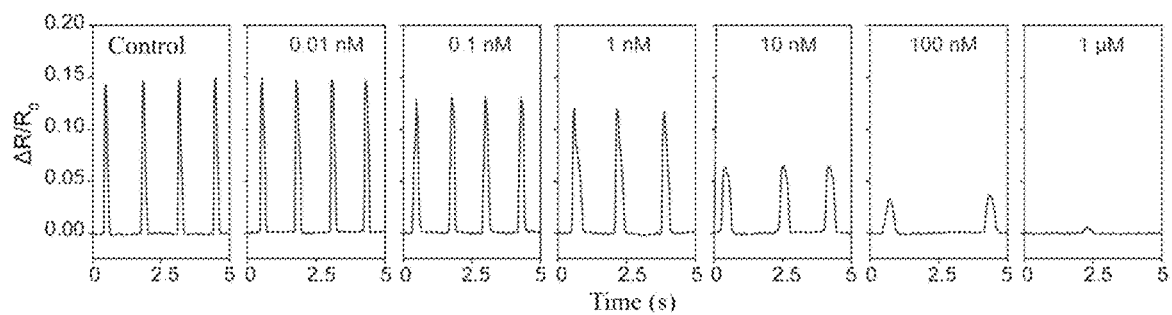
FIG. 4A to FIG. 4J: Changes in CM contractility under drug treatment using the crack sensor in the examples of the present invention.
Figure 4B:
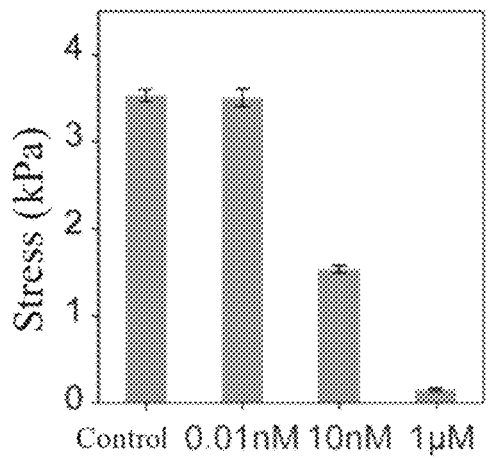
Figure 4C:
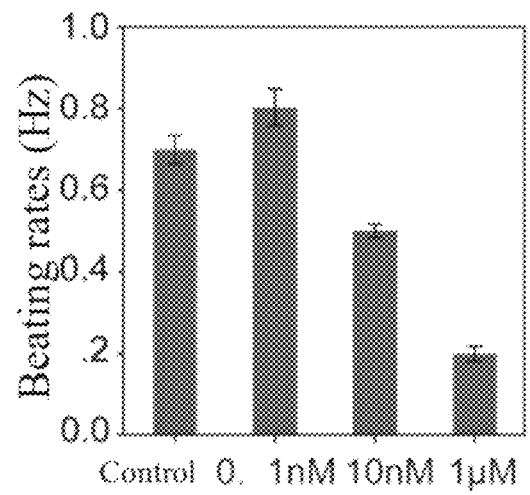
Figure 4D:
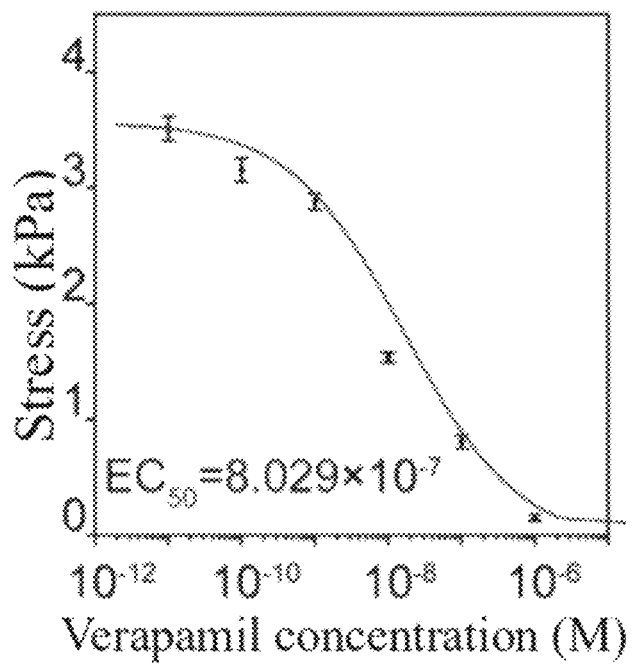
Figure 4E:
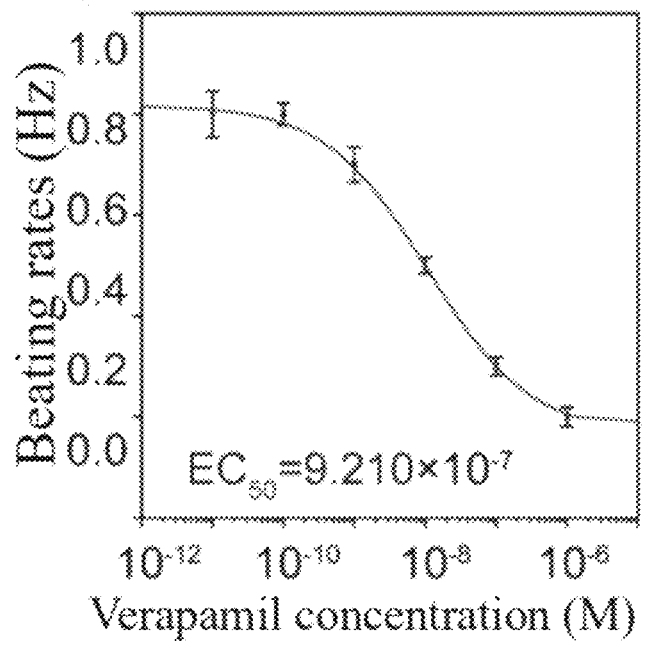

FIG. 4A showed the $\Delta R/R_0$ changes of CMs treated with verapamil at concentrations ranging from 0.01 nM to 1 μM. When the concentration reached 10 nM, the relative contractile force and beating rate of the CMs began to decrease. At 10 UM or higher concentrations, cardiac arrest was observed. The corresponding contractile stress and beating rate are shown in FIG. 4B and FIG. 4C. The $EC_{50}$ values of the contractile force and beating rate, calculated based on the drug dose-response curve, were $8.029 \times 10^{-7}$ M and $9.210 \times 10^{-7}$ M, respectively, as shown in FIG. 4D and FIG. 4E.

Figure 4F:
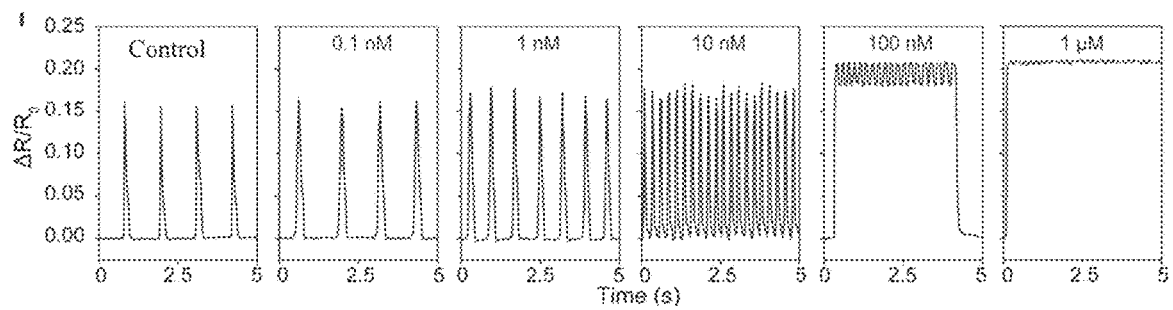
Figure 4G:
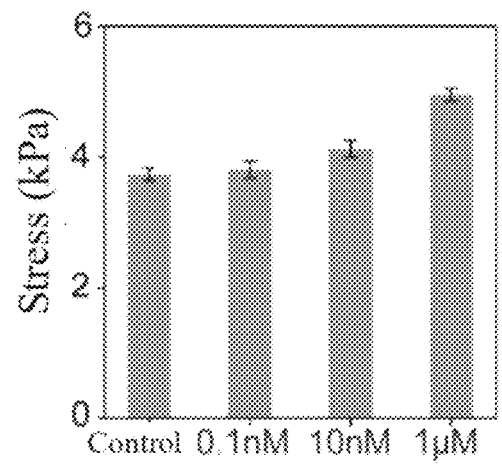
Figure 4H:
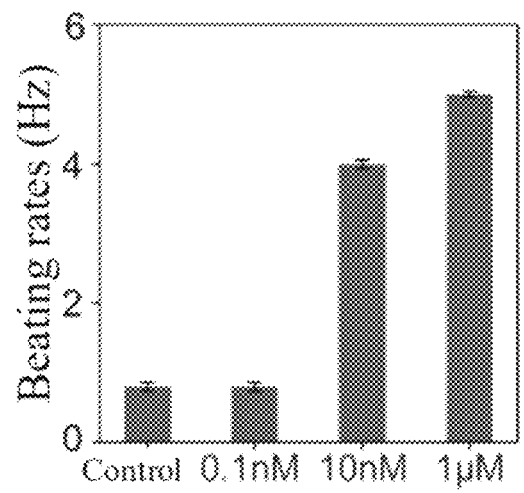
Figure 4I:
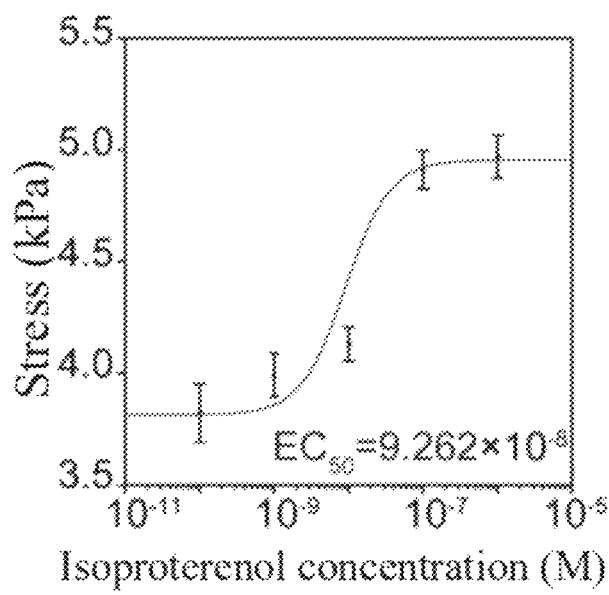
Figure 4J:
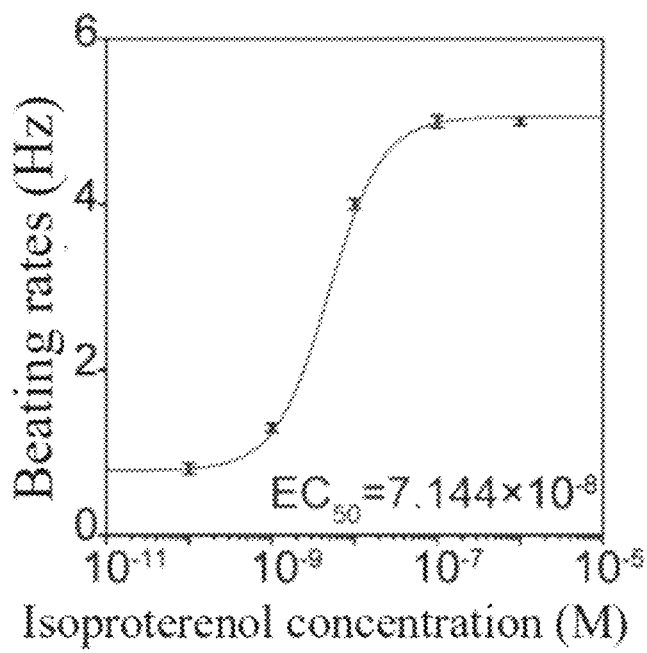

FIG. 4F showed the $\Delta R/R_0$ changes in CM contractility induced by isoproterenol treatment. As the concentration of isoproterenol increased from 0.1 nM to 1 μM, the contractile force and beating rate gradually increased. When the concentration of isoproterenol reached 100 nM, CM contractility became saturated, and symptoms of tachycardia began to appear. The corresponding contractile stress and beating rate are shown in FIG. 4G and FIG. 4H. The $EC_{50}$ values of the contractile force and beating rate, calculated from the dose-response curve, were $9.262 \times 10^{-8}$ M and $7.144 \times 10^{-8}$ M, respectively, as shown in FIG. 4I and FIG. 4J. These results confirmed that the Ag/CNT-PDMS crack sensor successfully detected the dynamic changes in CM contractility induced by different drug doses.

The above descriptions are merely preferred embodiments of the present invention and are not intended to limit the present invention. For those skilled in the art, various changes and modifications can be made to the present invention. Any modification, equivalent replacement, or improvement made within the spirit and principles of the present invention should be included within the scope of the present invention's protection.

The invention claimed is:

1. A method for preparing a crack sensor, comprising: coating a photoresist layer on a surface of a substrate; etching a plurality of microchannels on a surface of the photoresist layer; coating a layer of polydimethylsiloxane (PDMS) on the same surface, and curing to obtain a PDMS layer, wherein the PDMS layer has a first face with a plurality of linear protrusions and a second face that is smooth; covering the second face of the PDMS layer with a template having linear through-holes; successively forming a silver layer, a chromium layer, and a CNT-PDMS layer on a side of the template; removing the template to obtain a structure; and pre-stretching the structure to obtain the crack sensor; wherein the crack sensor comprises a flexible film, wherein a first side of the flexible film is provided with a plurality of linear protrusions, and an opposite second side of the flexible film is configured with a linear structure; the linear structure comprises, in order from bottom to top, a silver layer, a chromium layer, and a carbon nanotubes (CNT)-PDMS layer, wherein the CNT-PDMS layer is composed of PDMS doped with CNT; the silver layer is configured with a crack structure, the crack structure being a crack that changes in response to the deformation of the silver layer; wherein the flexible film is a PDMS film; the CNT-PDMS layer has a thickness of 5-20 μm; and the CNT-PDMS layer contains carbon nanotubes in an amount of 0.01-5 wt %.

2. The method according to claim 1, wherein the substrate is glass, and before coating the photoresist layer, the substrate is treated with $O_2$ plasma.

3. The method according to claim 1, wherein the silver layer and the chromium layer are formed by vacuum evaporation.

4. The method according to claim 1, wherein the CNT-PDMS layer is formed on a surface of the chromium layer by screen printing.

5. The method according to claim 1, wherein the pre-stretching is conducted under a strain of 1.5-2.5%.

6. A crack sensing device, comprising a crack sensor, a support, and a cell culture component, wherein the crack sensor is positioned between the support and the cell culture component, the support is provided with a groove or a through-hole, the crack sensor covers the groove or the through-hole, and a portion or the entirety of the linear structure of the crack sensor is located within the groove or the through-hole; wherein the crack sensor comprises a flexible film, wherein a first side of the flexible film is provided with a plurality of linear protrusions, and an opposite second side of the flexible film is configured with a linear structure; the linear structure comprises, in order from bottom to top, a silver layer, a chromium layer, and a carbon nanotubes (CNT)-PDMS layer, wherein the CNT-PDMS layer is composed of PDMS doped with CNT; the silver layer is configured with a crack structure, the crack structure being a crack that changes in response to the deformation of the silver layer; wherein the flexible film is a PDMS film; the CNT-PDMS layer has a thickness of 5-20 µm; and the CNT-PDMS layer contains carbon nanotubes in an amount of 0.01-5 wt %.

7. The crack sensing device according to claim 6, wherein further comprising a glass substrate, wherein the support is bonded to the glass substrate.

8. The crack sensing device according to claim 7, wherein the glass substrate is treated with $O_2$ plasma.

9. The crack sensing device according to claim 6, wherein the support is treated with $O_2$ plasma.

* * * * *